Oct. 25, 1932.  D. C. DAVIS  1,884,594
DRAFT RIGGING
Filed Oct. 12, 1926  2 Sheets-Sheet 1
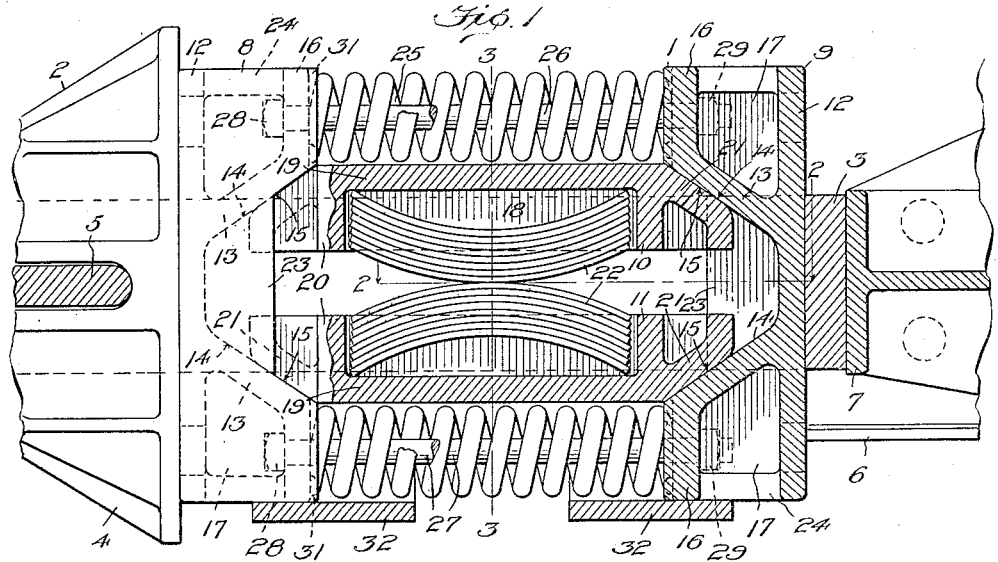
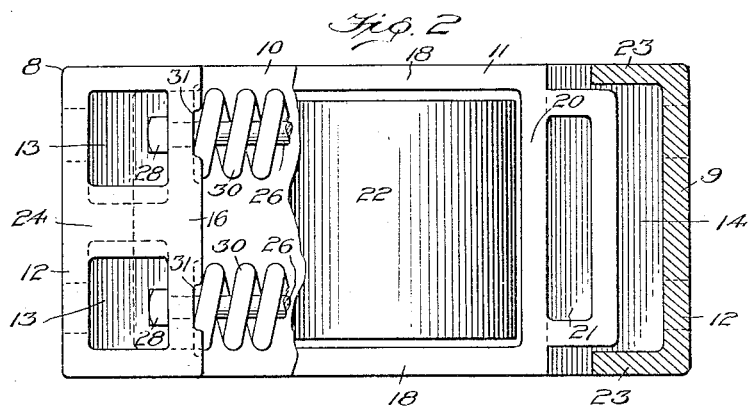
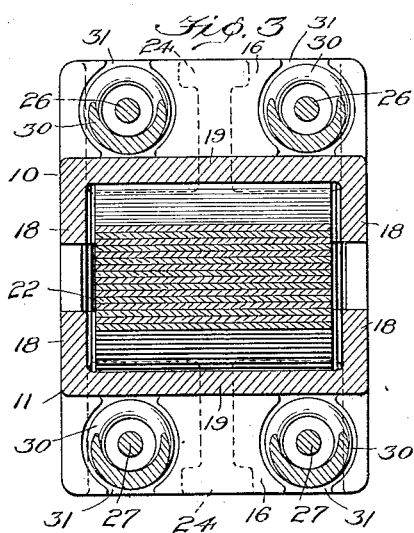
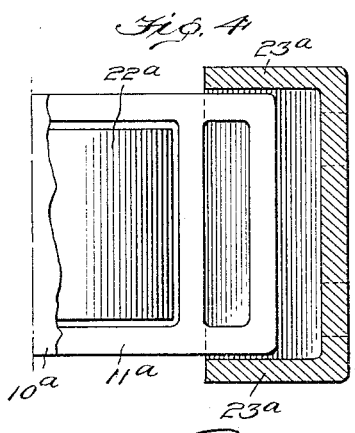
Inventor
Donald C. Davis
By
his Attorney Oct. 25, 1932.  D. C. DAVIS  1,884,594
DRAFT RIGGING
Filed Oct. 12, 1926   2 Sheets-Sheet 2

Inventor
Donald C. Davis
By
his Attorney

Patented Oct. 25, 1932

1,884,594

UNITED STATES PATENT OFFICE

DONALD C. DAVIS, OF DEPEW, NEW YORK, ASSIGNOR TO THE GOULD COUPLER COMPANY, OF NEW YORK, N. Y., A CORPORATION OF MARYLAND

DRAFT RIGGING

Application filed October 12, 1926. Serial No. 141,092.

This invention relates to draft rigging particularly adapted for railway cars and especially to frictional cushioning mechanism for use therewith.

The principal object of my invention, generally considered, is the provision of a friction cushioning mechanism especially adapted for use with railway draft rigging and designed for providing large capacity and adapted for being economically manufactured.

An object of my invention is the provision of a cushioning mechanism or friction draft gear comprising outer friction elements formed with outer or end walls from which inclined friction surfaces extend and inner walls extending substantially parallel to the outer walls from the inner ends of said inclined surfaces, intermediate friction elements formed with correspondingly inclined friction surfaces being positioned between said outer friction elements and provided with resilient means therebetween for urging them apart and into engagement with said outer friction elements.

Another object of my invention is the provision of a cushioning mechanism formed with outer friction elements provided with inclined friction surfaces diverging from end walls thereof, friction shoes positioned therebetween and formed with correspondingly inclined friction surfaces at the ends thereof engaging said friction surfaces on the outer friction elements, resilient means being provided between said friction shoes for urging them apart and into engagement with the outer friction elements, said mechanism and particularly the outer friction elements being adapted for being supported by means of carrier irons extending therebeneath.

A further object of my invention is the provision of a cushioning mechanism particularly adapted for use with railway draft rigging comprising interchangeable outer friction elements each formed with an end wall and friction surfaces extending upwardly and inwardly and downwardly and inwardly therefrom, intermediate friction shoes being positioned between said outer friction elements and each formed with longitudinal and transverse walls providing pockets for resilient means positioned therebetween, the ends of said friction elements being inclined to provide friction surfaces corresponding with the friction surfaces on the outer friction elements, said intermediate friction shoes being, if desired, provided with means for causing the same to remain in alinement while in service, said outer friction elements being retained in operative relation even when removed from associated draft rigging parts by longitudinally extending retaining bolts limiting movement of said elements away from each other but permitting sliding movement therealong toward each other, and coil springs preferably surrounding said retaining bolts and urging said outer friction elements away from each other to increase the capacity of the mechanism and insure the proper release thereof.

Other objects and advantages of the invention relating to the particular arrangement and combination of the various parts will become apparent as the description proceeds.

Referring to the drawings illustrating my invention, the scope whereof is defined by the appended claims:

Figure 1 is a side elevation of draft rigging associated with a cushioning mechanism embodying my invention, certain parts thereof being shown in vertical longitudinal section.

Figure 2 is a plan of the cushioning mechanism shown in Figure 1, certain parts thereof being shown in horizontal section.

Figure 3 is a transverse sectional view on the line 3—3 of Figure 1.

Figure 4 is a horizontal sectional view corresponding to Figure 2 but showing a modification.

Figure 5:
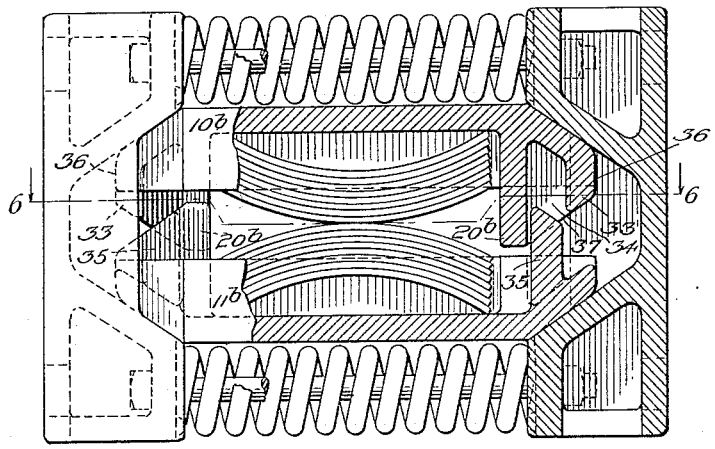
Figure 5 is a side elevational view of another form of frictional cushioning mechanism embodying my invention, certain portions thereof being shown in vertical longitudinal section.

Referring to the drawings in detail, like parts being designated by like reference characters and first considering the embodiment of my invention illustrated in Figures 1, 2 and 3, there is shown a cushioning mechanism or draft gear 1 especially adapted for use with railway draft rigging 2. Said draft rigging, in the present instance, is shown as of the Farlow type involving a horizontal yoke 3 embracing the cushioning mechanism 1, a front follower 4 and an ordinary form of supporting and connecting key 5 extending between draft or center sills 6 in a well known manner. The forward ends of the arms of the yoke 3 are connected to the rear end of a coupler (not shown) by means of a horizontal key (not shown) extending through correspondingly slotted portions of the coupler, yoke 3 and associated draft sills 6 in accordance with usual practice with Farlow attachments. The rear or U shaped portion of the yoke 3 is adapted to abut against a backstop 7 when buffing forces are applied to the gear, said backstop 7 being connected between and to the draft sills 6 in accordance with usual practice.

In the present embodiment of my invention, the cushioning mechanism comprises an outer or front friction element 8 and an outer or rear friction element 9, an intermediate or upper friction element or shoe 10 and an intermediate or lower friction element or shoe 11. The outer or end friction elements 8 and 9 may be of similar construction so as to be interchangeable for economical manufacture of the mechanism. Each outer friction element may comprise an outer or end wall 12 and walls 13 extending from intermediate portions of said end walls 12, said walls 13 providing inclined friction surfaces 14 which are normally engaged by correspondingly inclined friction surfaces 15 on the intermediate friction shoes 10 and 11. One of said walls or webs 13 of each outer friction element preferably extends upwardly and inwardly and is engaged by the upper friction shoe 10 and the other inclined wall or web 13 extends downwardly and inwardly and is engaged by the lower friction shoe 11. The inner ends of said inclined walls 13 are preferably extended by forming inner walls 16 disposed substantially parallel with the outer walls 12 and forming upper and lower pockets 17 between said outer walls, inner walls and inclined walls.

The intermediate friction elements or shoes 10 and 11 are each preferably formed with a pair of longitudinal normally vertical walls or webs 18 and a longitudinal normally horizontal wall or web 19. Said walls at the ends thereof are preferably joined by transverse normally vertical walls or webs 20 and inclined walls or webs 21, upon the latter of which are formed the correspondingly inclined friction surfaces 15. The walls 18, 19 and 20 provide pockets for receiving resilient means 22 which, in the present embodiment, consists of two sets of curved leaf springs, each set being disposed with their convex sides toward each other and their concave sides extending into the pockets in the intermediate friction shoes 10 and 11. Said resilient means 22 serves to urge said friction shoes 10 and 11 away from each other and into engagement with the friction surfaces 14 on the outer friction elements 8 and 9.

For preventing lateral displacement of the inner friction elements and particularly the tapering or inclined ends thereof with respect to the outer friction elements 8 and 9, said outer friction elements are provided with side walls or webs 23 which serve for guiding the ends of the friction shoes and, together with the inclined walls 13 and the end walls 12, provide pockets adapted to receive said ends when the gear is compressed. For strengthening the end friction elements 8 and 9, said side walls are preferably continued the full height of said elements. As an additional reinforcement between the end walls 12 and the inner walls 16, intermediate longitudinally extending walls 24, preferably T shape in cross section, may be provided therebetween as illustrated most clearly in Figure 3.

In order to increase the capacity of the gear and prevent the parts from becoming disconnected when removed from the associated parts of the draft gear, retaining means 25, preferably comprising a pair of upper longitudinally extending bolts 26 and a pair of lower longitudinally extending bolts 27 passing through corresponding apertures in the inner walls 16 of the end or outer friction elements 8 and 9 and prevented from undesired removal from said friction elements by the heads 28 and nuts 29, respectively, are provided. Surrounding each bolt 26 and 27 is resilient means which, in the present form, comprises a compression coil or helical spring 30. In order to maintain said springs in proper position, pocket or depressed portions 31 are preferably provided in the inner walls 16 of the friction elements 8 and 9 for receiving the ends of said springs. On account of the bolts 26 and 27, and springs 30, being disposed above and below or on two sides of the intermediate friction shoes 10 and 11, the latter are properly alined, if necessary, upon release of the gear. For maintaining the draft gear as a whole in proper position, supporting means preferably in the form of carry irons 32 are provided extending between the draft sills 6, underlying the end friction elements 8 and 9 and frictionally engaged thereby.

Referring now to the embodiment of my invention illustrated in Figure 4, a construction very similar to that disclosed in Figures 1, 2 and 3 is provided except that the curved spring plates 22ª are narrower than the spring plates 22 of the first embodiment, thereby involving the narrowing of the intermediate friction shoes 10ª and 11ª. An additional difference resides in the fact that the side walls 23ª of the outer friction elements are extended for the full length of said elements and are, therefore, somewhat longer than the side walls 23 intermediate the inclined friction surfaces of the members.

Figure 6:
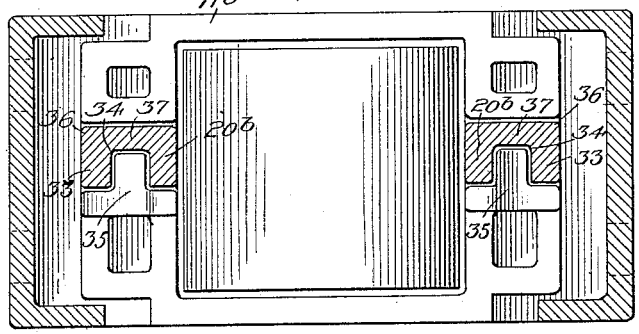
Figure 6 is a horizontal sectional view on the line 6—6 of Figure 5 looking in the direction of the arrows.
Figure 7:
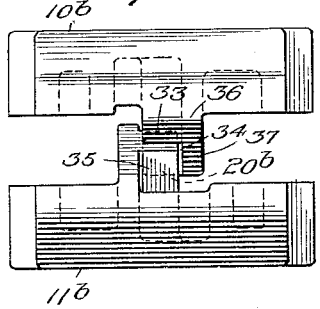
Figure 7 is an end elevational view of the inner or intermediate friction elements or shoes.

Referring now to the embodiment of my invention illustrated in Figures 5, 6 and 7, a construction almost identical with that disclosed in Figures 1, 2 and 3 is illustrated except that interfitting means are formed on the friction shoes 10ᵇ and 11ᵇ for causing the same to remain in alinement, that is, for preventing longitudinal shifting on one shoe with respect to the other. These means may take various forms and, in the present instance, I have shown the upper shoe 10ᵇ provided with a pair of depending webs 20ᵇ of greater depth than the corresponding webs 20 of the first embodiment. Said webs, together with the end webs 33 of said member, provide pockets or guiding sockets 34 adapted to receive upstanding webs or tongues 35 on the lower intermediate friction shoe 11ᵇ extending from adjacent the ends of the longitudinal web portion thereof. From a consideration of Figure 6, it will be seen that the upstanding webs or tongues 35 on the lower shoe 11ᵇ are preferably T shape in cross section with the stem of the T extending between the webs 20ᵇ and 33 which form, in effect, the sides of a U section 36, the base of said section being provided by a longitudinal intermediate web 37 at each end of the friction shoe 10ᵇ. Except for this interlocking or telescoping engagement between the friction shoes 10ᵇ and 11ᵇ, the remainder of the cushioning mechanism may be identical with that of the first embodiment.

The operation of my friction cushioning mechanism or draft gear is as follows. When either buffing or draft forces are applied to the coupler (not shown), the end friction elements 8 and 9 move toward each other, thereby squeezing the intermediate friction shoes 10 and 11 together against the resistance of the curved plate springs 22. When the gear is compressed to the extent that the ends of the shoes 10 and 11 meet the end walls 12 of the friction elements 8 and 9 or the shoes 10 and 11 meet one another, or both, further compression of the gear is prevented as well as overcompression of the plate springs and coil springs 30. When the applied force is withdrawn, the mechanism expands to its full length, as indicated particularly in Figures 1 and 5, under the influence not only of the plate springs 22 but the coil or helical springs 30 as well. Further expansion of the gear is prevented by means of the retaining bolts 26 and 27 as will be understood.

From a consideration of the foregoing, it will be apparent that I have devised a cushioning mechanism especially adapted for use with railway draft rigging involving high capacity and adapted for economical manufacture. On account of the employment of the releasing springs 30, sticking of the gear is not only obviated but the capacity thereof is substantially increased. Although the cushioning mechanism 1 is shown used with Farlow attachments and disposed with its greater transverse dimension in upright position, it is obvious that I am not limited to such use as it may be employed with its greater transverse dimension disposed horizontally and used with a vertical yoke or other forms of draft rigging parts.

Having now described my invention, I claim:

1. A cushioning mechanism comprising outer friction elements formed with end walls and other walls with inclined friction surfaces extending from intermediate portions thereof, inner walls extending from the inner ends of said inclined friction surfaces and disposed substantially parallel with respect to the end walls, resilient means engaging said inner walls, intermediate friction elements positioned between said outer friction elements and formed with correspondingly inclined friction surfaces engaging the friction surfaces on the outer elements, and resilient means positioned between the intermediate friction elements to urge them apart and into engagement with the friction surfaces on the outer friction elements.

2. A cushioning mechanism comprising outer friction elements formed with end walls and other walls with inclined friction surfaces extending therefrom, resilient means directly urging said elements apart, intermediate friction elements positioned between said outer elements and formed with correspondingly inclined friction surfaces normally engaging the friction surfaces on the outer elements, said intermediate friction elements being formed with complementary interengaging portions for causing said elements to remain in alinement, and resilient means positioned between said intermediate friction elements.

3. A cushioning mechanism comprising outer friction elements formed with end walls and other walls with inclined friction surfaces extending from intermediate portions thereof, inner walls extending from the ends of said inclined friction surfaces and positioned inwardly of and substantially parallel to the portions of the end walls beyond the connections with the friction surfaces, intermediate friction elements positioned between said outer friction elements and formed with correspondingly inclined friction surfaces normally engaging the friction surfaces on the outer elements, resilient means positioned between the intermediate friction elements, retaining means extending between the inner walls of the outer friction elements for limiting movement thereof away while permitting movement thereof toward each other, and resilient means associated with said retaining means for urging said outer friction elements away from each other.

4. A cushioning mechanism adapted for use with railway draft rigging comprising end friction elements each formed with an end wall and other walls with inclined friction surfaces extending from intermediate portions of said wall, inner walls extending from the ends of said inclined friction surfaces and disposed substantially parallel to the end walls, releasing means engaging said inner walls, intermediate friction elements positioned between the end friction elements and formed with correspondingly inclined friction surfaces engaging the friction surfaces on the end elements, and curved plate springs positioned between the intermediate elements to urge them apart and into engagement with the friction surfaces on the end friction elements.

5. A cushioning mechanism adapted for use with railway draft rigging comprising outer friction elements formed with end walls and other walls with friction surfaces extending normally upwardly and inwardly and downwardly and inwardly therefrom, intermediate friction shoes positioned therebetween, one of said shoes being formed with friction surfaces correspondingly inclined for engaging the upwardly and inwardly inclined friction surfaces on the outer friction elements and the other being formed with friction surfaces correspondingly inclined for engaging the downwardly and inwardly inclined friction surfaces on the outer elements, said intermediate friction shoes being formed with complementary flanges extending toward each other and alternately interleaved for alining said shoes, and plate springs positioned between said intermediate friction shoes for urging the same against the outer friction elements.

6. A cushioning mechanism adapted for use with railway draft rigging comprising outer friction elements formed with end walls and inclined walls with friction surfaces extending from intermediate portions thereof, inner walls extending from the ends of said inclined friction surfaces and positioned inwardly of and substantially parallel to the end walls, intermediate friction shoes positioned between said outer friction elements and formed with correspondingly inclined friction surfaces normally engaging friction surfaces on the outer elements, plate springs positioned between the intermediate friction elements and retaining bolts extending through and between the inner walls of the outer friction elements for limiting movement thereof away from each other and permitting movement thereof toward each other.

7. A cushioning mechanism adapted for use with railway draft rigging comprising outer friction elements formed with end walls and other walls with inclined friction surfaces extending from intermediate portions thereof, inner walls extending from the ends of said inclined friction surfaces and spaced inwardly of while remaining substantially parallel to said end walls, friction shoes positioned between the outer friction elements and formed with correspondingly inclined friction surfaces adapted to engage the friction surfaces on the outer elements, curved plate springs positioned between the intermediate friction elements, retaining bolts extending through and between the inner walls of the outer friction elements for holding said mechanism assembled while permitting normal inward movement of the outer friction elements with respect to each other, and coil springs surrounding said retaining bolts to increase the capacity of and effect the release of the mechanism.

8. A cushioning mechanism comprising interchangeable outer friction elements formed with end walls and other walls with inclined friction surfaces extending therefrom, complementary intermediate friction shoes positioned therebetween and formed with inclined surfaces corresponding with and adapted to engage the inclined friction surfaces on the outer elements, interfitting means formed on said shoes for causing them to remain in alinement, and resilient means positioned between said intermediate friction shoes to urge them apart and into engagement with the friction surfaces on the outer friction elements.

9. A cushioning mechanism comprising outer friction elements formed with end walls and other walls providing inclined friction surfaces and extending from said end walls, release springs for said outer friction elements, intermediate friction elements disposed between said outer elements and provided with correspondingly inclined friction surfaces normally engaging the friction surfaces on the outer elements, curved plate springs disposed between said intermediate friction elements for urging them apart, and means for preventing relative longitudinal shifting of said elements.

10. A cushioning mechanism comprising interchangeable outer friction elements formed with end walls and other walls providing inclined friction surfaces extending therefrom, complementary intermediate friction shoes disposed therebetween and having inclined friction surfaces corresponding with and adapted to engage the friction surfaces on the outer elements, resilient releasing means for said outer elements adapted to align the intermediate shoes, and curved plate springs disposed between said intermediate shoes to urge them apart and into engagement with the friction surfaces on the outer elements.

11. A cushioning mechanism adapted for use with railway draft rigging comprising outer friction elements formed with end walls and inclined friction surfaces extending therefrom, intermediate friction elements positioned therebetween and formed with correspondingly inclined friction surfaces engaging the friction surfaces on the outer elements, resilient means positioned between the intermediate friction elements to urge them apart and into engagement with the friction surfaces on the outer friction elements, and resilient means extending between the outer friction elements to facilitate release of the mechanism.

12. A cushioning mechanism comprising friction elements formed with end walls and inclined friction surfaces extending therefrom and toward each other, intermediate friction elements positioned therebetween and formed with friction surfaces engaging the friction surfaces on the first-mentioned friction elements, resilient means positioned between the intermediate friction elements to urge them apart and into engagement with the friction surfaces on the other friction elements, each of said first-mentioned friction elements being formed with pockets positioned adjacent the corners thereof and opening toward corresponding pockets in the other of said elements, resilient means positioned in said pockets to urge said first-mentioned friction elements apart, and retaining means connecting said first-mentioned friction elements, permitting limited relative movement thereof and retaining all of said friction elements in assembled relation.

13. A cushioning mechanism adapted for use with railway draft rigging comprising outer friction elements formed with end walls and portions extending toward one another and provided with inclined friction surfaces, intermediate friction elements positioned between said outer friction elements and formed with correspondingly inclined friction surfaces engaging the friction surfaces on the outer elements, resilient means acting on said intermediate friction elements to urge them apart and into engagement with the friction surfaces on the outer friction elements, and resilient means acting on the outer friction elements longitudinally of the mechanism to facilitate release.

14. A cushioning mechanism comprising outer friction elements formed with end walls and other walls providing inclined friction surfaces and extending from said end walls, intermediate friction elements disposed between said outer elements and comprising longitudinal portions extending from one outer friction element to the other and wedge portions with inclined friction surfaces normally engaging the friction surfaces on the outer elements, springs disposed between said intermediate friction elements for urging them apart, and a tongue extending from adjacent one end of one of said longitudinal portions into a guiding socket adjacent one end of the other for preventing relative longitudinal shifting therebetween.

In testimony whereof I affix my signature.

DONALD C. DAVIS.